(a)

(b)

(c)

(d)

INVENTOR.
Nobuhiko Aoki
Masayuki Ajiro

BY Mestern & Mestern

March 21, 1967 NOBUHIKO AOKI ET AL 3,310,755
D.C.-A.C. CONVERSION CIRCUIT HAVING OUTPUT FREQUENCY WHICH IS
INDEPENDENT OF LOAD AND POWER SUPPLY VARIATIONS
Filed Feb. 21, 1964

INVENTOR.
Nobuhiko Aoki
Masayuki Ajiro

BY

Western & Western

United States Patent Office 3,310,755
Patented Mar. 21, 1967

3,310,755
D.C.-A.C. CONVERSION CIRCUIT HAVING OUTPUT FREQUENCY WHICH IS INDEPENDENT OF LOAD AND POWER SUPPLY VARIATIONS
Nobuhiko Aoki, Hachioji-shi, and Masayuki Ajiro, Chofu-shi, Japan, assignors to Kabushiki Kaisha Hitachi Seisakusho, Tokyo-to, Japan, a joint-stock company of Japan
Filed Feb. 21, 1964, Ser. No. 346,451
Claims priority, application Japan, Feb. 23, 1963, 38/9,274
4 Claims. (Cl. 331—113)

This invention relates to D.C.-A.C. conversion, and more particularly it relates to a new circuit provided with active elements such as transistors, a transformer, and a D.-C. power supply and adapted to generate A.-C. voltage with an amplitude which is proportional to the D.-C. supply voltage.

It is a general object of the present invention to provide a D.C.-A.C. conversion circuit which has almost none of the various disadvantages possessed by conventional D.C.-A.C. converters as will be described in greater detail hereinafter.

It is another object to provide a circuit of the above stated character having a simple construction and high conversion efficiency.

The foregoing objects and other objects and advantages as will presently become apparent have been achieved by the present invention, the nature, principle, and details of which will be most fully understood by reference to the following description, taken in conjunction with the accompanying drawings in which like parts are designated by like reference characters, and in which.

Figure 8:
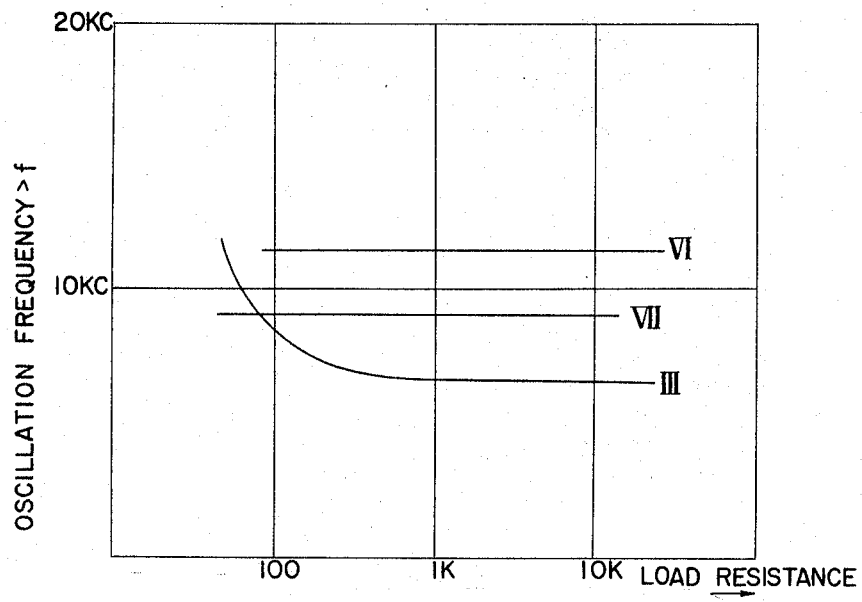

FIGS. 4(a)–(d) show a graphical representation of waveforms, presented for the purpose of description of the operation of a circuit of the invention;

FIG. 8 shows the characteristic curves of load resistance to oscillation frequency according to the invention.

For a full understanding and appreciation of the nature and utility of the present invention, the following brief consideration of D.C.-A.C. converters of known type, presented merely for purposes of comparison, is believed to be prerequisite.

Figure 1:
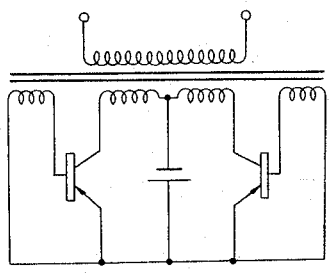
FIGS. 1 and 2 are circuit diagrams respectively indicating circuits of known arrangement for generating rectangular waves.
Figure 2:
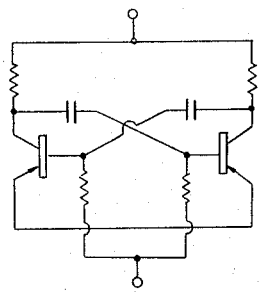

Of the D.C.-A.C. converters known heretofore, there have been the converter, as shown in FIG. 1, comprising two transistors in push-pull connection with a saturable core and the converter, as shown in FIG. 2, wherein two transistors are connected in push-pull connection by way of a CR network, and A.C. voltage is generated by causing transition of the two transistors from the conductive state to the cut-off state alternately with a period determined by the CR time constant circuit. These two conventional types of D.C.-A.C. converters have the following disadvantages.

In the case of the converter shown in FIG. 1, the frequency $f$ of repetition of its A.C. output may be expressed by the following equation.

$$f = K \frac{V_O}{N_P A B_m} \quad (1)$$

where $V_O$ is the D.C. power source voltage; $N_P$ is the number of turns of the primary winding; $A$ is the cross-sectional area; and $B_m$ is the maximum saturating flux density.

Since the value of $B_m$ is determined by the nature of the core material used, and it is difficult to change the value of $N$ once it is set, the power source voltage $V_O$ must be varied in order to vary the frequency $f$. Consequently, the converter in this case is disadvantageous in that when the frequency varies, the amplitude of the output waveform voltage also varies simultaneously. This converter has further disadvantages such as that of substantial lowering of efficiency due to core loss necessary for magnetizing the core to saturation and that of increasing difficulty, because of the core characteristics, in oscillating as the frequency increases.

The converter shown in FIG. 2 also has several disadvantages such as: the necessity of simultaneously changing the constants of two elements in order to vary the frequency; the great influence of the oscillation frequency on quantities such as the power source voltage and the load; and the difficulty in taking out an independent output from the main oscillator unit by transformer coupling.

It is a specific object of the present invention to provide a new D.C.-A.C. conversion circuit which does not have the above stated disadvantages.

The invention will now be described particularly with respect to the case wherein a square wave is generated.

Figure 3:
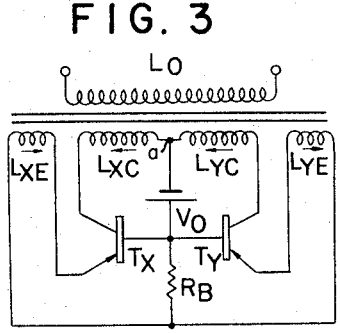
FIGS. 3, 5, 6 and 7 are circuit diagrams respectively indicating different preferred embodiments of the D.C.-A.C. conversion circuit according to the present invention.
Figure 4:
Figure 4:
Figure 4:
Figure 4:
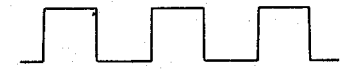

In one embodiment of the present invention, which is shown by the circuit diagram in FIG. 3, and the operation of essential parts of which is indicated in FIG. 4, there are provided a D.-C. power source $V_O$, two transistors $T_X$ and $T_Y$, a transformer with input windings $L_{XE}$, $L_{XC}$, $L_{YE}$, and $L_{YC}$ and output winding $L_O$, and a resistance $R_B$, respectively connected as shown in FIG. 3, all of the said windings being wound about a common core. The windings $L_{XE}$, $L_{XC}$, $L_{YE}$, and $L_{YC}$ are fully coupled magnetically and have numbers of turns of winding as follows: $N_P$ turns in windings $L_{XC}$ and $L_{YC}$ and $N_S$ turns in windings $L_{XE}$ and $L_{YE}$. In the analysis to follow, the denotations $L_{XC}$, $L_{XE}$, $L_{YC}$, and $L_{YE}$ will be taken to represent the inductances of their respective windings, and, moreover, it will be assumed that $L_{XC}=L_{YC}$, $L_{XE}=L_{YE}$, and $L_{XE}=L_{XC}$. Furthermore, the arrows below the windings as shown in FIG. 3 indicate the directions of the respective electromotive forces of said windings which are produced for the same magnetic flux variation.

When the circuit is in the state wherein the transistor $T_Y$ is in its cut-off state, the transistor $T_X$ is in its saturated state, and a conductive state exists respectively between the terminals of the collector, base, and emitter, the voltage across the two ends of the winding $L_{XC}$ is always substantially equal to the voltage $V_O$ of the D.-C. power source. Because transistor $T_X$ is in conductive state, the voltage across the collector-base electrodes is extremely small and therefore negligible in comparison to $V_O$. That is, the current $i_x$ flowing through the winding $L_{XC}$ satisfies the following relationship.

$$\frac{di_x}{dt} L_{XC} = V_O \quad (2)$$

Accordingly, the current $I_X$ may be expressed by the following Equation 3.

$$i_x = \frac{V_O}{L_{XC}} t - I_X' \quad (3)$$

where the direction of the current from the collector toward the outside is taken to be positive; and $I_X'$ is the initial current which is caused to flow from the collector of the transistor $T_X$ toward the base by a reaction voltage induced in the winding $L_{XC}$ at the instant of transition of the transistor $T_Y$ from "on" to "off". In this case, since the above-mentioned reaction voltage is of the polarity which causes the collector to have a positive potential with respect to the base, the value of $I_x'$ is considerably large with the result that it cannot be neglected. It should be mentioned here that the saturation condition for the transistor $T_X$ is satisfied by the existence of an amply conductive state between the collector and the base in the region of $i_x<0$ and by the attainment of an amply conductive state between the emitter and the base in the region of $i_x>0$.

Since the transistor $T_Y$ is in the cut-off state, the entire collector current $i_x$ passes through the power supply $V_O$. On one hand, a voltage $V_{XE}$ which may be expressed by the following equation is induced at the winding $L_{XE}$, with the emitter side taken as positive, by the magnetic flux variation due to the above said current $i_x$.

$$V_{XE} = V_O \frac{N_S}{N_P} \qquad (4)$$

Also when the voltage across the emitter and base of transistor $T_X$ which is in "on" state is designated $V_{EB}$, the current $I_{RB}$ passing through resistor $R_B$ can be represented by the following equation.

$$I_{RB} = \left( V_O \frac{N_S}{N_P} - V_{EB} \right)/R_B \qquad (5)$$

Since the current $I_B$ flowing through the base of transistor $T_X$ is the difference of current $I_X$ flowing into the D.C. power supply $V_O$ and the current $I_{RB}$, it can be represented by the following equation.

$$I_B = \left( V_O \frac{N_S}{N_P} - V_{EB} \right)/R_B - i_x \qquad (6)$$

The value of this current $I_B$ determines the state of the transistor. In other words, when the ratio of magnitude of the base current $I_B$ with respect to the collector current $i_x$ is larger than when it is in ordinary state (or in the case of $i_x/\beta < I_B$, if the current amplification factor between the base and the collector of the transistor is $\beta$), the transistor is said to be in a saturated state. Inversely, in the case of $I_B = i_x/\beta$, the transistor is in active state. In this example, after the transistor $T_X$ has shifted from the "off" to the "on" state, the current $i_x$ maintains negative polarity for some length of time, or positive polarity of minor and negligible value, so that the ratio of current $I_B$ to $i_x$ becomes large, and transistor $T_X$ thereby is kept in the state of saturation. However, when the ratio of current $i_x$ gradually increases in accordance with Equation 3 and the magnitude of current $I_B$ becomes an order of a few per cent of the current $i_x$, transistor $T_X$ no longer can maintain its saturated state and shifts to the active state. Then a regeneraive feedback is pressed on the transistor through the collector winding $L_{XC}$ and the emitter winding $L_{XE}$. Consequently, transistor $T_Y$ instantaneously changes from the "off" to the "on" state due to the voltage induced in the collector winding $L_{YC}$ and emitter winding $L_{YE}$ of transistor $T_Y$. Thereafter, the above-named operation is repeated to continue oscillation.

The collector current $i_x$ of transistor $T_X$ and the collector current $I_Y$ of transistor $T_Y$ assume the triangular waveforms shown in FIG. 4(a), and current $i_y$ lags by a half-cycle from current $i_x$. Through these collector currents, a magnetic flux is created as shown in FIG. 4(c), whereby rectangular waveform voltage is generated in each winding as shown in FIG. 4(d). Then, the collector currents of transistors $T_X$ and $T_Y$ pass through the junction $a$ of collector windings $L_{CX}$ and $L_{CY}$ and flow into the D.C. power supply $V_O$. Accordingly, the waveform of the current in the junction $a$ is as shown in FIG. 4(b).

The period of the above mentioned repeated operation may be expressed in the following manner on the basis of the operational principle described above. That is, the time $t$ by which the value of the current $I_B$ given in Equation 6 satisfies the relationship of $I_B = i_x/\beta$, determines the period during which the transistors are in the "on" state.

Now, when $I_B = i_x/\beta$ is substituted in Equation 6, the following equations are obtained.

$$i_x \left( 1 + \frac{1}{\beta} = V_O \frac{N_S}{N_P} - V_{EB} \right)/R_B \qquad (7)$$

Usually, since $\beta \gg 1$, $$i_x = \left( V_O \frac{N_S}{N_P} - V_{EB} \right)/R_B \qquad (8)$$

The current $I_X$ in Equation 3 is a current such as a magnetic flux which has been created by the collector current of the transistor $T_Y$ immediately prior to the transition of transistor $T_Y$ to its "off" state is preserved by the initial collector current $I_X$, of transistor $T_X$ immediately after transition of the transistors $T_Y$ and $T_X$ to the cut-off and conductive states, respectively. Therefore, in the ideal case with no load current and no leakage flux, this current $I_X'$ is equal to the collector current at the final end of the conducting time interval of the transistor $T_Y$. Moreover, for the case when the circuit is exactly symmetrical with respect to the two transistors $T_X$ and $T_Y$, the final collector current of transistor $T_Y$ is equal to the final collector current of transistor $T_X$, which is expressed by $I_X$, this being the value of the current $i_x$ when the conduction time T of transistor $T_X$ is substituted for $t$ of Equation 3. For this reason, the application of the relationship $I_X = I_X'$, to Equation 3 produces the following equation.

$$I_X = I_X' = \frac{V_O}{2L_{XC}} T \qquad (9)$$

When $I_X$ of Equation 9 is substituted for $i_x$ of Equation 8, conduction time T of transistor $T_X$ and the repetition frequency $f$ can be ascertained.

$$T = 2 \frac{L_{XC}}{R_B} \left( \frac{N_S}{N_P} - \frac{V_{EB}}{V_O} \right) \qquad (10)$$

$$f = \frac{1}{2T} = \frac{R_B}{4L_{XC}} \bigg/ \left( \frac{N_S}{N_P} - \frac{V_{EB}}{V_O} \right) \qquad (11)$$

By selecting the variables so that $(N_S/N_P) \gg (V_{EB}/V_O)$, the following relationship is obtained.

$$f = \frac{R_B N_P}{4 L_{XC} N_S} \qquad (12)$$

Thus, the repetition frequency becomes independent of the power source voltage.

In this case, when the load resistance $R_L$ is connected, the collector current will be the sum of the magnetizing current and the load current. Accordingly, the collector current required for maintaining the conductive state of the transistor should be more than the sum of current $I_X$ as expressed in Equation 9. That is, if the minimum value necessary is designated $I_{Xe}$, it is represented by the following equation.

$$I_{Xe} = I_X + \frac{V_O}{R_L} = \frac{V_O}{2 L_{CX}} T + \frac{V_O}{R_L} \qquad (13)$$

When $I_{Xe}$ is substituted for $i_x$ of Equation 8, the following equations are obtained.

$$T = \frac{2 L_{XC}}{R_B} \left\{ \frac{N_S}{N_P} - \frac{R_B}{R_L} - \frac{V_{BE}}{V_O} \right\} \qquad (14)$$

$$f = \frac{1}{2T} = \left( \frac{R_B}{4 L_{XC}} \right) \bigg/ \left\{ \frac{N_S}{N_P} - \frac{R_B}{R_L} - \frac{V_{BE}}{V_O} \right\} \qquad (15)$$

Accordingly, in a circuit of the arrangement shown in FIG. 3, the oscillation frequency is greatly influenced by the magnitude of the load resistance.

Figure 5:
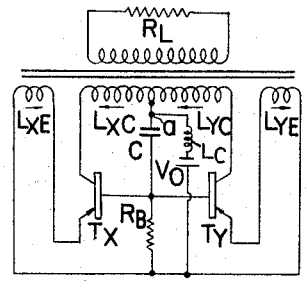

Another embodiment of the invention as shown in FIG. 5 is so designed as to reduce the effect on the oscillation frequency of the load resistance as exists in the circuit shown in FIG. 3. In the circuit shown in FIG. 5, a capacitor C is inserted between the junction of the windings $L_{XC}$ and $L_{YC}$ and the common base of transistors $T_X$ and $T_Y$, and moreover, a choke coil $L_C$ and the power source $V_O$ are series-connected between the junction of the windings $L_{XE}$ and $L_{YE}$ and the junction $a$. Operation of the embodiment of FIG. 5 will be described in the following.

Among the current passing through the point $a$ in the circuit of FIG. 5, the magnetizing current component passing through the collector coil has a triangular wave form such as shown in FIG. 4($b$) and consists of only an alternating current. Accordingly, the said exciting current component does not pass through the power supply circuit because of existence of the alternating current suppressing choke coil $L_C$ does flow, through a condenser C, toward the bases of transistors $T_X$ and $T_Y$, and controls these transistors to their cut-off state or on-state. On the other hand, since the load current in the collector coil caused by insertion of a load resistor $R_L$ becomes only a direct current component at the point $a$ in the circuit of FIG. 5, this current is suppressed by a condenser C and cannot pass toward the bases of transistors $T_X$ and $T_Y$. Accordingly all parts of the current pass through the circuit of the power supply, and do not participate in determining the oscillation frequency. As described above, in the circuit of FIG. 5, frequency variation due to variation of the load resistance is extremely low in comparison with the circuit of FIG. 3.

The oscillation frequency in the above-named example is almost identical with that of the circuit shown in FIG. 3 provided there is no load at all, because in the circuit of FIG. 5 the current passing through capacitor C is substantially equal to the collector current of FIG. 3 when there is no load. The current passing through the capacitor C determines the oscillation frequency. However, in the circuit of FIG. 5, the voltages between the collector windings and the emitter windings are different from those shown of the circuit shown in FIG. 3.

Now, assuming that the voltage across the terminals of the collector windings is $E_{CX}$, the voltage across the terminals of the emitter windings is $E_{EX}$, and the voltage across the emitter and the collector is negligible when the transistor is in saturated state, the following equations are established.

$$E_{CX} - E_{EX} = E_{CX} - \frac{N_S}{N_P} E_{CX} = E_{CX} \frac{N_P - N_S}{N_P} = V_O \quad (16)$$

Therefore:

$$E_{CX} = V_O \frac{N_P}{N_P - N_S} \quad (17)$$

$$E_{EX} = V_O \frac{N_S}{N_P - N_S}$$

When $E_{EX}$ is substituted for $V_O$ in Equation 11, the oscillation frequency of the example in FIG. 5 can be obtained.

Figure 7:
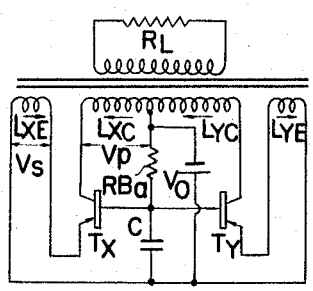
Figure 6:
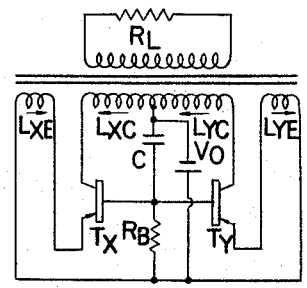

FIGS. 6 and 7 show other examples according to the invention. According to these embodiments, it is possible to decrease the variations in frequency due to the variations in load resistance. In the circuits shown in FIGS. 6 and 7, since the current flowing through the resistor $R_B$ is constant, only the current flowing through capacitor C is capable of changing the state ("on" or "off") of the transistors.

The load current solely has a D.C. component and no A.C. component, so that it does not flow in the capacitor C of FIGS. 6 and 7 and therefore has nothing to do with the determination of the oscillation frequency. Accordingly, it becomes apparent that the oscillation frequency in the circuits of FIGS. 6 and 7 is not affected to any appreciable extent by the load variations.

On the other hand, not all of the current passing through capacitor C in FIGS. 6 and 7 is the magnetizing current, but only a part of it.

Therefore, since the ratio of increase in current is smaller than in the case of the entire magnetizing current flowing in capacitor C, it takes a long time for the current to attain such a value that it is capable of changing the state of the transistors from "on" to "off." Therefore, the circuits shown in FIGS. 6 and 7 have lower frequency than those in FIGS. 3 and 5, provided that the other conditions are the same.

A comparison between the load characteristics of the oscillation frequency of the circuits shown in FIGS. 6 and 7 and that of the circuit shown in FIG. 3 is indicated in FIG. 8, the curves therein designated by references VI, VII, and III corresponding respectively to the circuits shown in FIGS. 6, 7 and 3. It will be observed from FIG. 8 that the frequency stability in the case of the circuits of FIGS. 6 and 7 is superior to that in the case of the circuit of FIG. 3.

As will be apparent from the foregoing description, in the square wave generator circuit according to the present invention, the disadvantageous features associated with conventional oscillation circuits of similar type have been almost entirely eliminated. By the practice of this invention, square waves can be generated by means of a circuit of very simple composition and arrangement, and the frequency of the oscillation can be readily varied by merely varying the resistance elements. For example, in the circuit of FIG. 3, the variable range of oscillation frequency in the case wherein the resistance $R_B$ is varied is from 30 to 150 kc./sec. Furthermore, this frequency is determined with almost no relation to the power source voltage. For example, it has been found through actual experience that, with respect to a power source voltage variation of from 5 to 10 volts in the circuit of FIG. 3, the resulting frequency fluctuation is 10 percent or less. In contrast, in the case of a conventional circuit as shown in FIG. 1, the oscillation frequency varies proportionally with the power source voltage.

The circuit of the present invention additionally has the following advantageous features. By transformer coupling, an output which, with respect to direct current, is independent of the oscillation circuit can be readily led out. By a measure involving a simple circuit arrangement, it is possible greatly to reduce the effect of the load resistance on the oscillation frequency. Since there is no necessity of causing saturation of the transformer core, an excessively large, useless current does not flow, and losses such as the iron loss and copper loss are extremely low, wherefore the efficiency of the circuit as a D.C.-A.C. power converter is high. Furthermore, the possibility of oscillation in the linear region of inductance of the transformer as described above makes possible the use of a transformer with low hysteresis loss and iron loss, whereby, since it is possible to reduce high-frequency loss, oscillation at high frequencies can be more readily generated than in the case of known methods and means wherein the saturation characteristics of the core are utilized.

That is, in the case wherein a ferrite core is used in the transformer in the conventional circuit shown in FIG. 1, it is very difficult to cause oscillation at a frequency of several tons of kilocycles per second, whereas, in the case of the circuit shown in FIG. 3 according to the present invention, oscillation at a frequency of 100 kc./sec. or higher can be readily obtained.

It is to be observed that, the conversion circuit of the present invention possesses numerous advantageous features whereby it is effectively applicable as an oscillator for exciting modulators, for example, as an excitation circuit for transistor chopper circuits and for voltage variable capacitance diode modulators, as a rectangular wave signal generator, and as a temperature-frequency transducer in the case wherein a temperature-sensitive element such as a thermistor is used, for example, for the resistance $R_B$ in the circuit of FIG. 3.

It should be understood, of course that the foregoing disclosure relates to only preferred embodiments of the

What is claimed is:

1. A D.C.-A.C. conversion circuit comprising a pair of transistors; a first winding provided with a center tap inserted between the collectors of said pair of transistors; second and third windings magnetically coupled to said first winding; said second and third windings each having first and second terminals; said first terminals being connected to a common junction; each second terminal being connected to an emitter of one of said pair of transistors; a direct current power supply; and a series circuit comprising a capacitance element and a resistance element inserted between the center tap of said first winding and said common junction; the junction of said resistance element and said capacitance element being connected to the bases of said pair of transistors, and said power supply being connected to said center tap and said common junction; whereby said pair of transistors is controlled to repeat periodically "on" and "off" states by the electric currents flowing in said capacitance and resistance elements at a frequency represented by equation $$f = \frac{R_B N_P}{4 L_{XC} N_S}$$

wherein $R_B$ is the resistance value of said resistance element; $L_{XC}$ is the inductance of the winding inserted between the collector of one of the transistors; and the power source; $N_p$ is the number of turns of the winding inserted between the collectors of said pair of transistors; and $N_S$ is the number of turn of the winding inserted between the emitters of said pair of transistors.

2. The D.C.-A.C. conversion circuit as defined in claim 1 wherein said series circuit is constructed by connecting said capacitance element to the center tap of the first winding and said resistance element to said common junction.

3. The D.C.-A.C. conversion circuit as defined in claim 1, wherein said series circuit is constructed by connecting said resistance element to the center tap of the first winding and said capacitance element to said common junction.

4. The D.C.-A.C. conversion circuit according to claim 1 wherein the direct current power supply is series-connected to a choke coil.

References Cited by the Examiner

UNITED STATES PATENTS

| 3,009,093 | 11/1961 | Seike | 321—2 X |
| 3,056,931 | 10/1962 | Bloomquist et al. | 331—113 |
| 3,079,525 | 2/1963 | Tap | 331—113 |
| 3,147,406 | 9/1964 | Kotas | 331—113 |

FOREIGN PATENTS 651,744  11/1962  Canada.

OTHER REFERENCES

Butler: "Transistor Invertors and Rectifier - Filter Units." Electronic Engineering, July 1959, pp. 412–418.

Fleming: "Transistors and Saturable-Core Transformers as Square Wave Oscillators," Electronic Engineering, September 1959, pp. 543–545.

Keister: "Transistor-Magnetic Analog Multiplier," Electronics, October 1956, pp. 160–163.

ROY LAKE, *Primary Examiner.*

J. B. MULLINS, *Assistant Examiner.*